(12) United States Patent
DeMaria et al.

(10) Patent No.: US 7,199,330 B2
(45) Date of Patent: Apr. 3, 2007

(54) SYSTEMS AND METHODS FOR FORMING A LASER BEAM HAVING A FLAT TOP

(75) Inventors: Anthony J. DeMaria, West Hartford, CT (US); Leon A. Newman, Glastonbury, CT (US); Vernon Sequin, Windsor, CT (US)

(73) Assignee: Coherent, Inc., Santa Clara, CA (US)

( * ) Notice: Subject to any disclaimer, the term of this patent is extended or adjusted under 35 U.S.C. 154(b) by 144 days.

(21) Appl. No.: 10/760,687

(22) Filed: Jan. 20, 2004

(65) Prior Publication Data

US 2005/0157762 A1    Jul. 21, 2005

(51) Int. Cl.
*B23K 26/067* (2006.01)
*G02B 27/10* (2006.01)
*H01S 3/10* (2006.01)

(52) U.S. Cl. .............. 219/121.76; 359/618; 372/9; 372/55

(58) Field of Classification Search .......... 219/121.76, 219/121.73, 121.75; 372/9, 55; 359/618
See application file for complete search history.

(56) References Cited

U.S. PATENT DOCUMENTS

| | | | | |
|---|---|---|---|---|
| 3,476,463 A | | 11/1969 | Kreuzer | 350/189 |
| 3,793,595 A | * | 2/1974 | Russon et al. | 372/32 |
| 4,025,875 A | * | 5/1977 | Fletcher et al. | 372/30 |
| 4,707,584 A | * | 11/1987 | Kimbara | 219/121.76 |
| 4,832,446 A | * | 5/1989 | Miyagawa | 359/559 |
| 5,454,808 A | | 10/1995 | Koop et al. | 606/17 |
| 5,670,069 A | * | 9/1997 | Nakai et al. | 219/121.73 |
| 5,674,414 A | | 10/1997 | Schweizer | 219/121.77 |
| 6,548,781 B1 | | 4/2003 | Brunwinkel | 219/121.73 |
| 6,717,105 B1 | * | 4/2004 | Okamoto et al. | 219/121.76 |
| 6,750,423 B2 | * | 6/2004 | Tanaka et al. | 219/121.73 |
| 6,784,399 B2 | * | 8/2004 | Dunsky et al. | 219/121.68 |
| 6,838,638 B2 | * | 1/2005 | Satou et al. | 219/121.73 |
| 6,852,947 B2 | * | 2/2005 | Tanaka | 219/121.76 |
| 6,898,221 B2 | * | 5/2005 | Berger et al. | 372/32 |
| 2003/0031214 A1 | * | 2/2003 | Tanaka et al. | 372/9 |
| 2004/0136416 A1 | * | 7/2004 | Tanaka | 372/24 |

FOREIGN PATENT DOCUMENTS

JP    57-90987    6/1982

(Continued)

OTHER PUBLICATIONS

A.D. Colley et al., "High brightness slab waveguide carbon monoxide laser," *Applied Physics Letters*, vol. 64, No. 22, May 30, 1994, pp. 2916-2918.

(Continued)

*Primary Examiner*—Geoffrey S. Evans
(74) *Attorney, Agent, or Firm*—Stallman & Pollock LLP

(57) ABSTRACT

Multiple laser beams, each having a shape such as a Gaussian profile, can be incoherently combined to obtain a shaped, flat top laser beam. The combined laser beams can provide power levels necessary for material processing applications such as annealing, drilling, and cutting, while minimizing the amount of unused power. The lasers can be positioned in an array in order to shape the flat top beam, and can be staggered in position where necessary to give each output beam an equal beam path length. The relative frequencies and/or powers of the lasers can be adjusted to control the flatness and stability of the incoherently combined beam.

54 Claims, 13 Drawing Sheets

FOREIGN PATENT DOCUMENTS

| | | |
|---|---|---|
| JP | 1-287979 | 11/1989 |
| JP | 10-258383 A * | 9/1998 |
| JP | 2003-37079 A * | 2/2003 |
| WO | WO 02/50599 A1 | 6/2002 |

OTHER PUBLICATIONS

K.M. Abramski et al., "High-Power Two-Dimensional Waveguide $CO_2$ Laser Arrays," *IEEE Journal of Quantum Electronics*, vol. 32, No. 2, Feb. 1996, pp. 340-348.

F.J. Villarreal et al., "Beam Reformatting of One- and Two-Dimensional Arrays of $CO_2$ Waveguide Lasers," *IEEE Journal of Quantum Electronics*, vol. 35, No. 3, Mar. 1999, pp. 267-272.

J.A. Hoffnagle et al., "Beam Shaping with a plano-aspheric lens pair," *Opt. Eng.*, vol. 42, No. 22, Nov. 2003, pp. 3090-3099.

"*Laser Beam Shaping Theory and Techniques,*" edited by Fred M. Dickey and Scott G. Holswade, printed by Marcel Decker, New York, Chapter 3, entitled "Gaussian Beam Shaping: Diffraction Theory and Design," pp. 119-161.

* cited by examiner

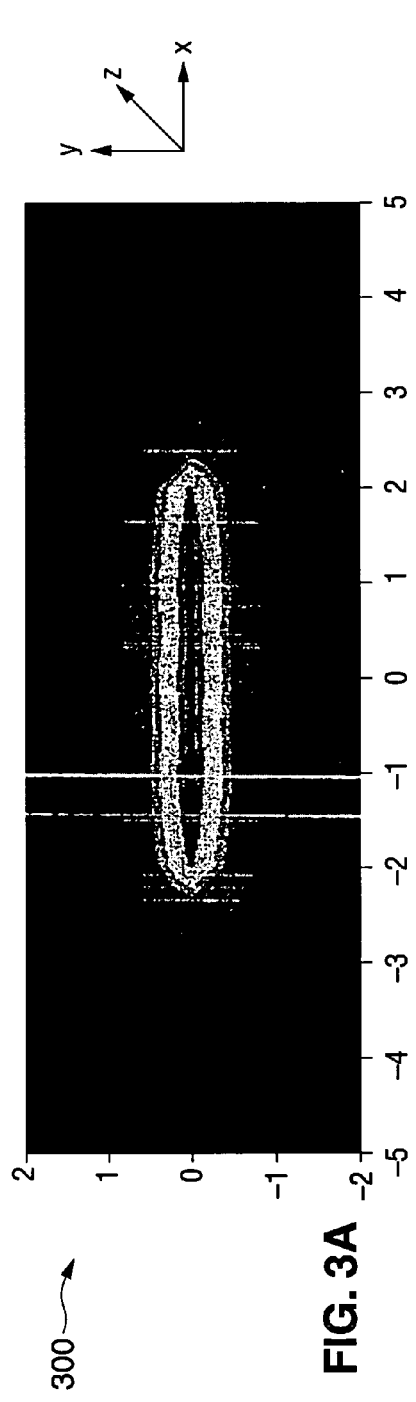
FIG. 3A
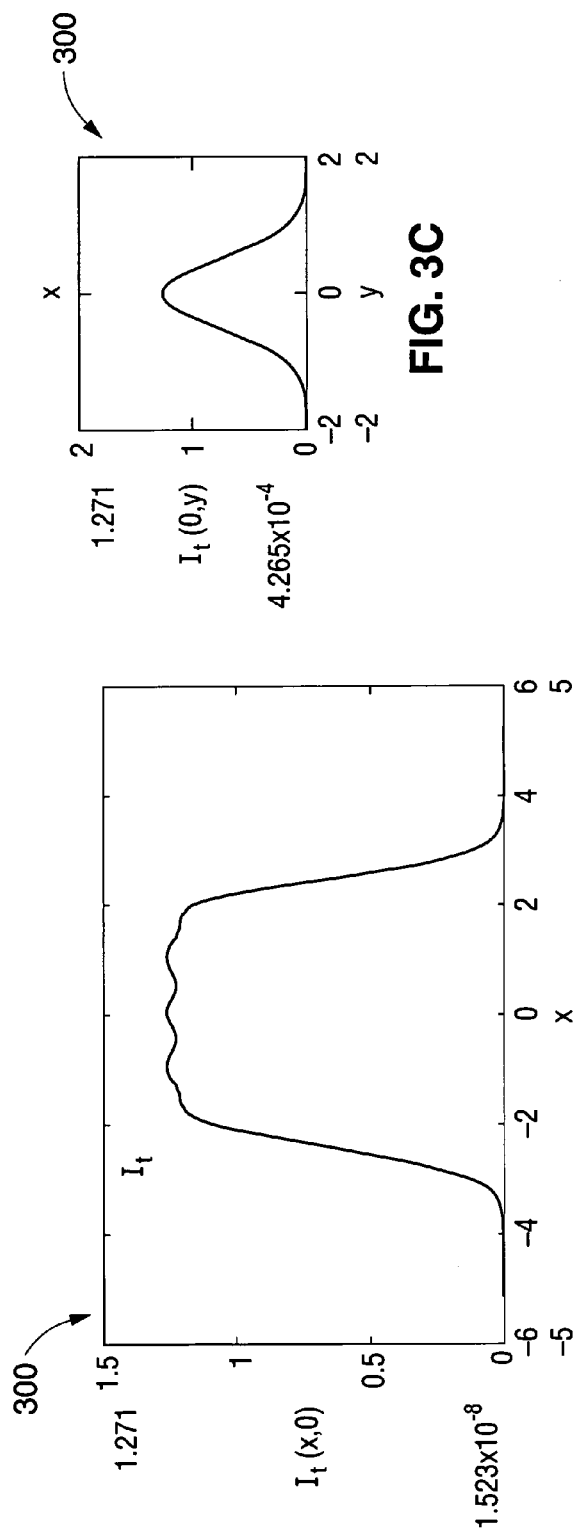
FIG. 3B
FIG. 3C

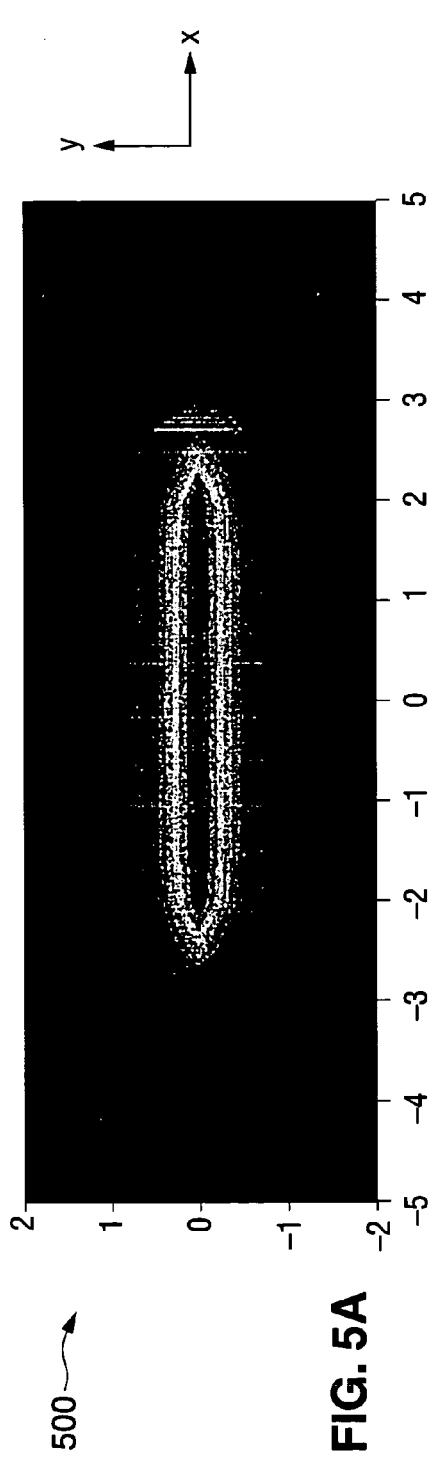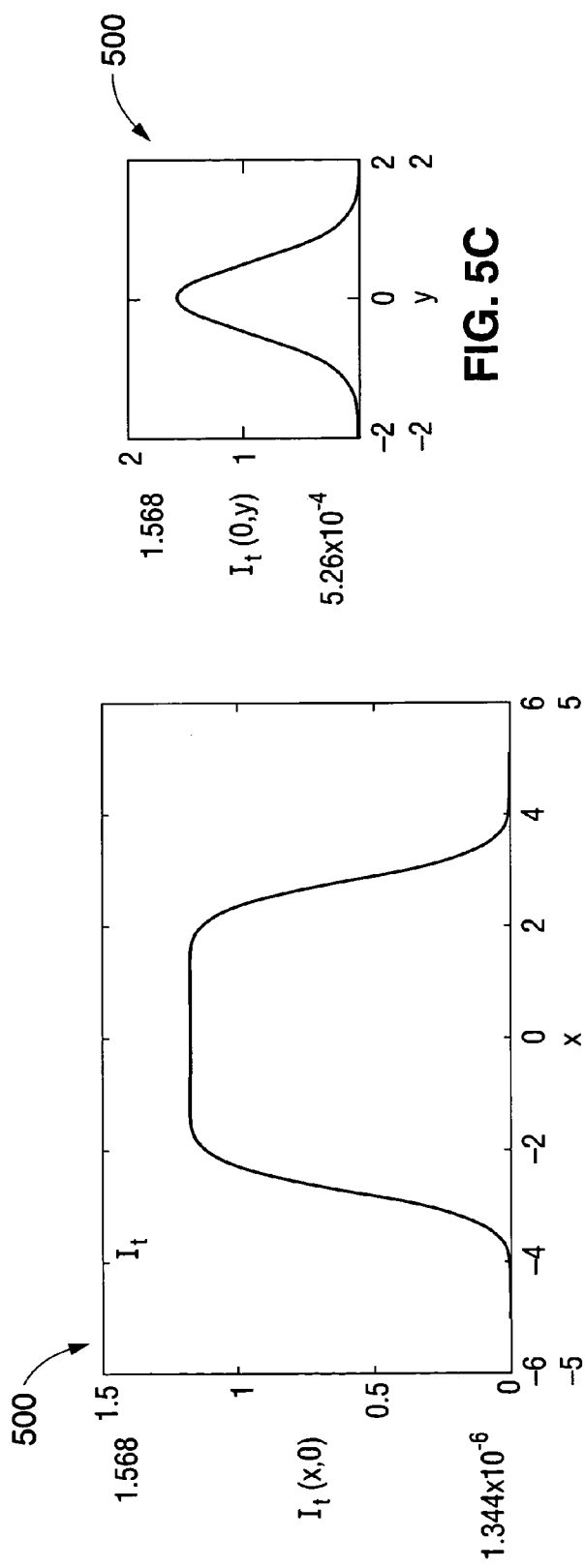
FIG. 5A
FIG. 5B
FIG. 5C

SYSTEMS AND METHODS FOR FORMING A LASER BEAM HAVING A FLAT TOP

TECHNICAL FIELD OF THE INVENTION

The present invention relates to the generation of a substantially stable, flat top laser beam.

BACKGROUND

Various material processing applications require use of a laser beam with a relatively flat top intensity profile, instead of a more traditional Gaussian intensity profile. These applications can include, for example, the drilling of holes in printed circuit boards with very little taper to the sidewalls of the holes, and the processing of glass or ceramics, which can include steps such as annealing, cutting, and fusing. Consequently, various techniques have been developed for obtaining beams with substantially flat top intensity profiles in line, square, or round shape configurations. One approach is to utilize the center portion of a Gaussian laser beam. This approach can be problematic, however, as a significant amount of power is lost due to the discarding of the remaining portion of the beam. The lost power cannot simply be compensated for by increasing the power of the laser, however, as the stability of the beam amplitude becomes increasingly more difficult to sustain as the laser power is increased. Further, such an approach can be expensive, as only a portion of the power will be used. Higher power lasers also tend to have larger power variations with time, as well as larger output wavelength variation over time.

Another approach to providing a flat top laser beam is to utilize diffractive optics. Such an approach is well known in the art, but has not been demonstrated to have better than a 10% amplitude variation across the intensity profile of the beam. For many applications requiring a flat top beam, a variation of 10% in intensity across the top of the profile is not acceptable. Further, such an approach again requires a high power laser beam, and it is well known that the output wavelengths and the gas discharges associated with high power lasers, such as lasers on the order of 500 W to 600 W, tend to have varying wavelengths over time, and numerous small discharge "hot spots" within the beam give rise to numerous amplitude variations (i.e., noise) in the output beams under continuous wave (CW) operation. The tendency to form arcs in CW discharges of large cross-sectional area slab lasers is one reason why slab lasers are normally operated under pulsed conditions. While operating a slab laser at a lower than normal gas pressure has been shown to improve the behavior of CW discharges, such an approach results in reduced output power for a given laser size.

BRIEF DESCRIPTION OF THE DRAWINGS

FIG. 3 is another intensity profile of the beams of FIG. 1.

FIG. 5 is an intensity profile for seven combined beams, instead of five beams as in FIG. 1.

DETAILED DESCRIPTION

Figure 1:
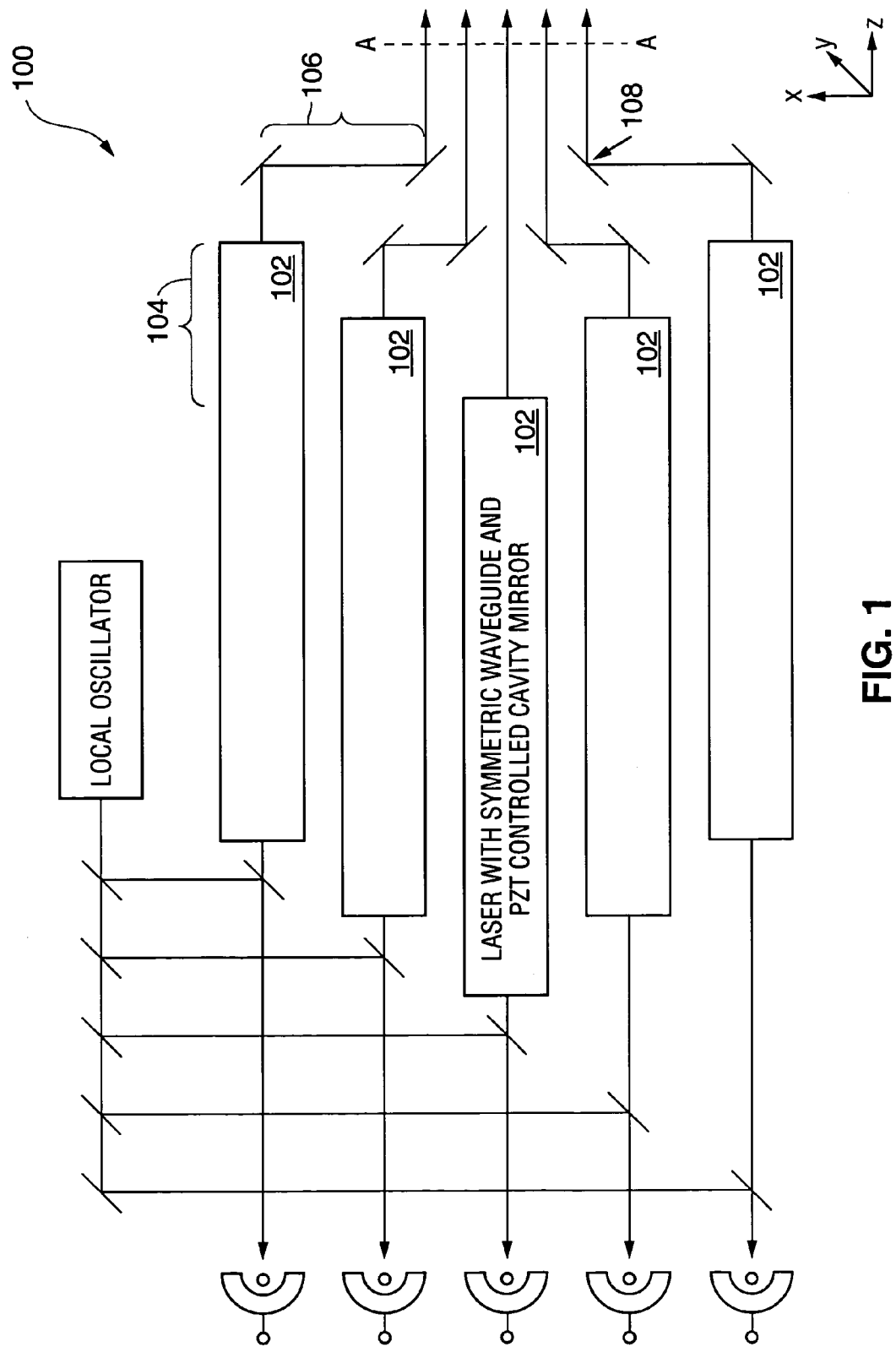
FIG. 1 is a diagram of an optical arrangement in accordance with one embodiment of the present invention.

Systems and methods in accordance with embodiments of the present invention can overcome many of the deficiencies in existing approaches to producing a laser beam with a reasonably flat top intensity profile. In one embodiment, beams from multiple lasers, such as a rectangular or square bore waveguide $CO_2$ lasers at the 50 W to 200 W power level, can be incoherently combined to form a combined beam with a substantially flat top intensity profile. A combined beam can be said to have a flat top intensity profile when the variations across an intensity profile of the beam at the plane of treatment are within an acceptable range for the given application or process. For certain applications, this can include an intensity profile which results in a commercially flat feature being formed in the surface upon which the combined beam operates. The profile of the beam will not be "flat" per se, as there will be some amount of variation across the top of the intensity profile, but can be smooth enough that the resultant manufactured feature will be within specification. In one embodiment, the amplitude variation over the substantially flat top portion of the intensity profile is on the order of about +/−0.5%. For many applications, a variation on the order of up to +/−5% can be acceptable, while for other applications the flat portion of the intensity profile can exhibit a variation of up to +/−10%. The flatness of the beam can also depend upon the plane of examination, or the distance from the individual lasers at which the combined beam is examined, as the variations in intensity can increase on either side of the plane of examination due to factors such as beam spreading.

The output beams from the individual lasers each can be well behaved, such that a combined beam can efficiently generate 500 W of power in a flat top laser beam, which is greater than the power of any individual beam. The combined beam also can be wider than any of the individual beams at the plane of treatment. Such an approach can be attractive due at least in part to the fact that all the laser power is used efficiently, not simply the central part of a beam as in prior art systems. Each individual laser can produce a high quality Gaussian output beam with little power output amplitude variation, a highly-controlled beam shape, and a low level of pointing stability jitter. Such systems also can have a single line output, and can utilize any of a number of frequency stabilization techniques. In addition, waveguide $CO_2$ lasers can have a gas lifetime exceeding 20,000 hours, which equals or exceeds the lifetime of semiconductor laser pump sources used in diode pumped solid-state lasers. $CO_2$ waveguide lasers are mass produced in quantities, currently at a rate of approximately several thousand per year, such that the lasers are relatively inexpensive when compared with 500 W or higher power slab lasers. For these and other reasons, it can be advantageous to combine multiple waveguide $CO_2$ laser beams to form a flat top shaped laser beam for material processing applications such as may include welding, fusing, heat treating, hole drilling, annealing, and material cutting. Such an approach is not limited to $CO_2$ lasers, but can be used with any appropriate laser or laser system.

Multiple highly-stabilized laser beams can be incoherently summed to form a flat top laser beam at a given plane in space, such as a plane of treatment for surface machining processes, which can be imaged onto a work piece in order to meet a desired power density at the work piece. FIG. 1 illustrates a linear, one-dimensional array of lasers that can be used to form a flat top line-shaped beam in accordance with one embodiment, although other laser arrangements, such as a two dimensional pattern, also can be used to form beams such as square, round, and bar-shaped laser beams having a smooth-top intensity profile. In the arrangement 100 of FIG. 1, five identical $CO_2$ lasers 102 are shown forming a one-dimensional array of beams. An array of optical elements, such as may include a pair of reflective mirrors 108 for each laser as shown in FIG. 1, can be used to redirect the beams output by each laser into the one-dimensional array of beams. Any number of optical configurations and/or optical elements can be used to accomplish such redirection as known in the art, the elements including for example lenses, polarizers, mirrors, beam splitters, windows, and/or prisms. The optical elements can direct the beams along substantially similar beam paths. The beam paths can have a fixed and/or predetermined separation, such as on the order of two to three beam radii, such that the energy from the beams will combine at a distance from the lasers to form a combined beam with a flat top profile.

The individual lasers can be any appropriate lasers, such as five GEM-100 square bore waveguide $CO_2$ lasers available from Coherent, Inc. of Santa Clara, Calif. It should be understood that the array of five identical $CO_2$ lasers is exemplary, and that a different number of lasers, an array of non-identical lasers, or an array containing lasers other than $CO_2$ lasers can be utilized in the arrangement of FIG. 1. A square-shaped waveguide is chosen in this example, as this configuration can provide a pure single mode that has a near-ideal Gaussian profile. Slightly rectangular shaped waveguides also can be used, such as where an elliptical-shaped laser beam from each laser is desired. For instance, elliptical shaped beams can be particularly attractive in forming flat top, line-shaped beams. Dimensions of a square waveguide yielding good mode quality and power output in one embodiment are on the order of about 0.11 inches by 0.11 inches. In this embodiment, each laser has a piezoelectric translator (PZT) actuator attached to a high reflectivity feedback mirror, which can be used to vary the cavity length of the respective laser. The lasers can be staggered in position as shown in FIG. 1, such that at any given orthogonal plane (such as plane A in the Figure) the optical distance along the beam path from that plane back to each of the lasers is as equivalent as possible. For example, the position of a laser along the z-axis in the Figure can be adjusted by an amount 104 that is approximately equal to the lateral offset 106 of the laser along the x-axis, relative to the position of the output beam from that laser in the A plane. The separation of adjacent laser output beams can be on the order of at least two or three laser beam radii in the near-field, in order to control diffraction and overlap between the beams. Beam diameter adjusting telescopes (not shown), or other beam-diameter adjusting devices, can be incorporated into the arrangement 100 in order to fine tune the beam diameter for each of the laser beams in FIG. 1.

Figure 2A:
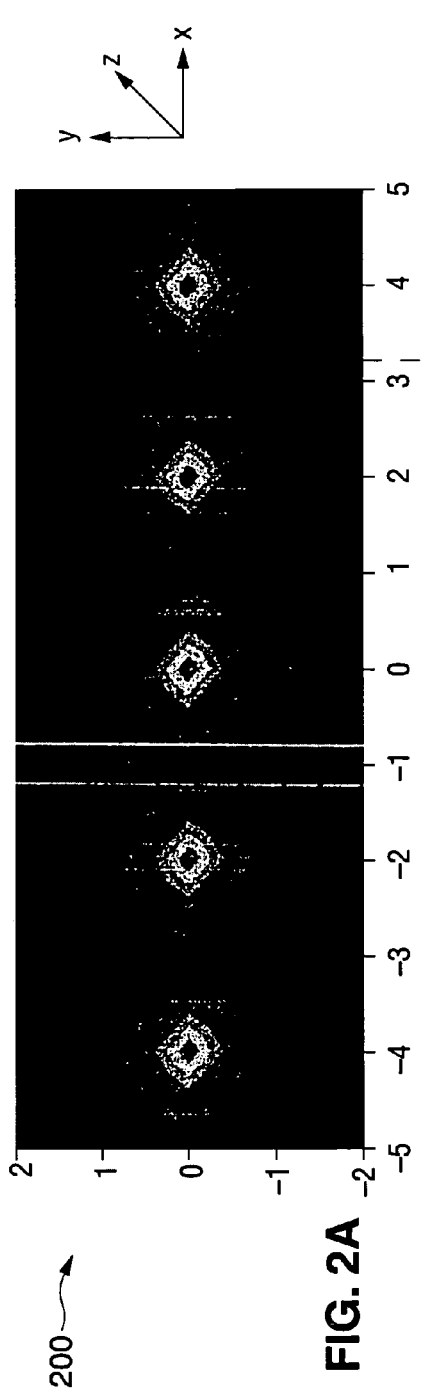
FIG. 2 is an intensity profile of the beams of FIG. 1.
Figure 2C:
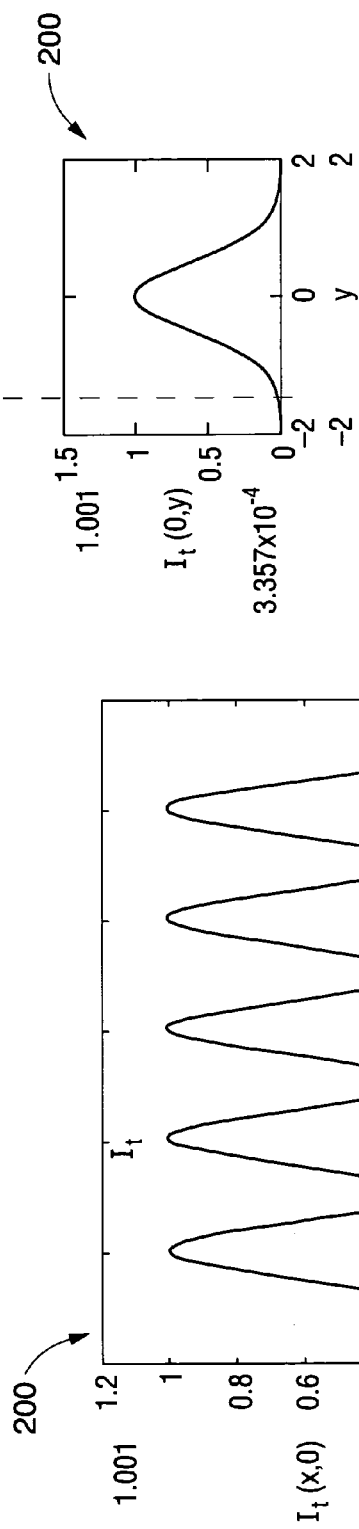
Figure 2B:
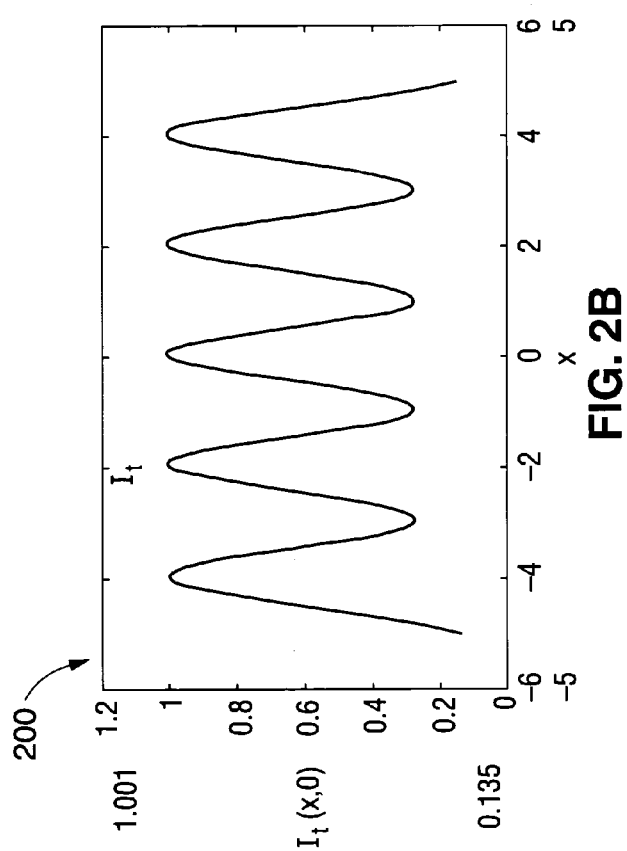
Figure 4A:
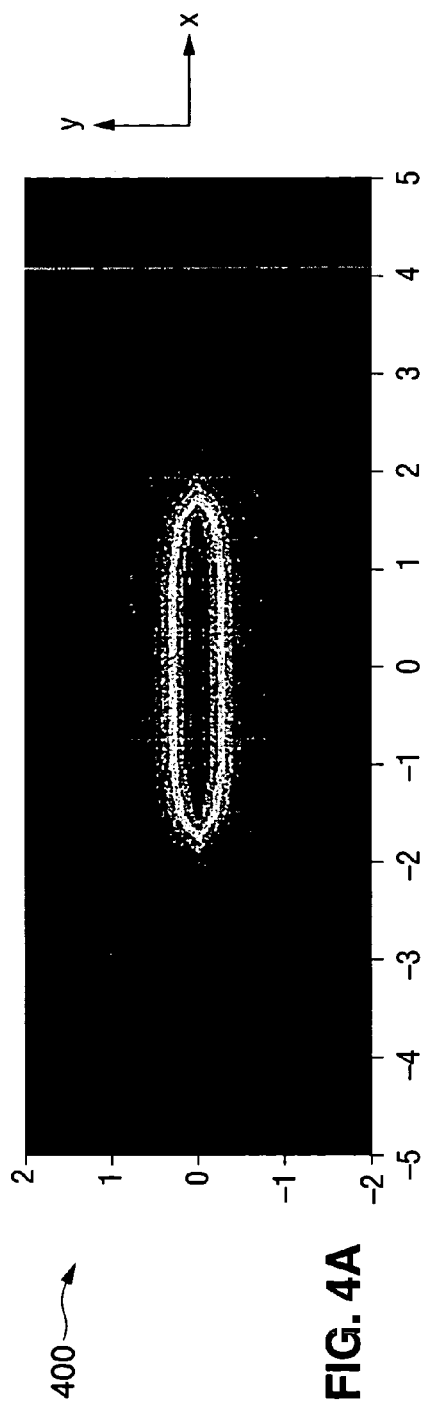
FIG. 4 is another intensity profile of the beams of FIG. 1.
Figure 4C:
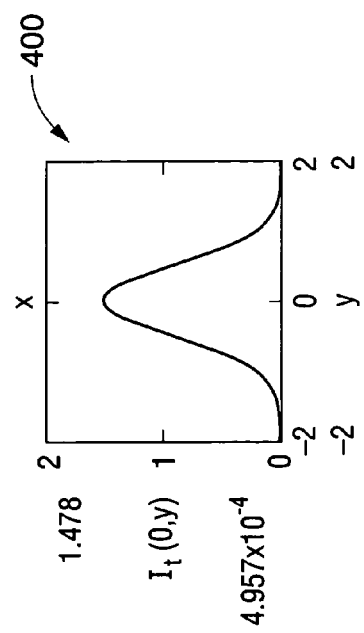
Figure 4B:
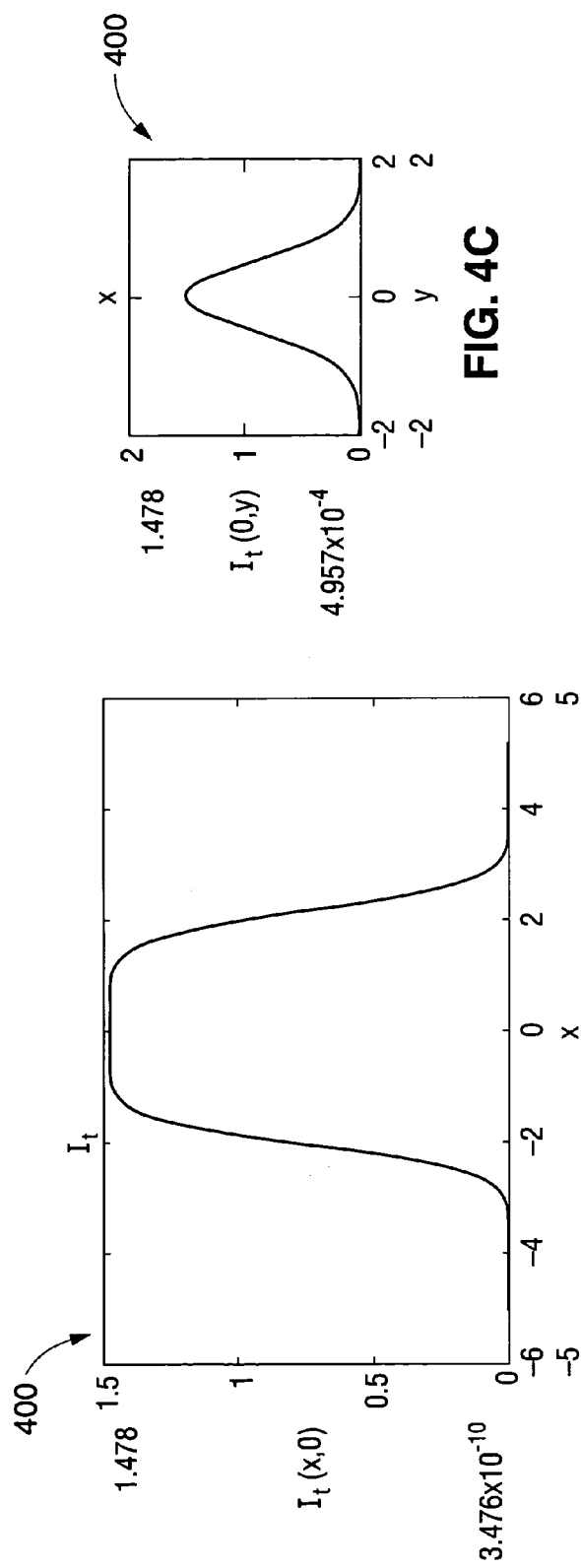

FIG. 2 shows individual beam profiles 200 for the lasers of FIG. 1 after having diffracted to a separation of about two beam radii. FIG. 2(a) shows the intensity variation for a cross-section of the beam array, while FIG. 2(b) shows the intensity variation along the x-axis at y=0, and FIG. 2(c) shows the intensity variation of the five "identical" Gaussian beams along the y-axis. FIG. 3 illustrates similar intensity profiles 300 for the incoherently combined beams of FIG. 1 after diffracting to a separation of one beam radius. While a flat top line beam profile has begun to develop, some ripple in the combined beam profile is noticeable in FIG. 3(b), which might be unacceptable for various applications. The beam intensity also has narrowed in the x-direction, and the total intensity of the flat top line is greater than the intensity of any of the individual beams shown in FIG. 2, due at least in part to the over-lapping of the five laser beams. FIG. 4 illustrates the intensity variation 400 when the beams have diffracted with a 0.85 beam radii separation. The amount of amplitude ripple is significantly reduced with respect to the variation in FIG. 3, such that the intensity profile might be sufficiently flat, or smooth, for various applications. The total intensity is also greater than in FIG. 3.

Computer modeling using an approach such as that described with respect to FIGS. 2–4 can be helpful in determining the location from the lasers at which the combined beams have the desired shape and/or intensity for a desired application. Such modeling also can be done for other beam shapes and/or combinations. For instance, FIG. 5 illustrates a calculated intensity variation 500 when seven identical round Gaussian laser beams are combined, instead of the five beams of FIG. 1, after diffracting to the point where the individual beams have a separation of 0.8 beam radii. The flat top line beam profile has a peak amplitude of approximately 1.6 times the peak amplitude of one beam, and the laser beam width at the half-power points of the combined beam is approximately half of the total distance from all the beams emitted from the all lasers at the source.

Favorable results have been shown by FIGS. 2 through 5 when "identical" Gaussian beams are used. In practice, the beams will not be truly identical, and will be at least somewhat incoherent with respect to each other, due to slight variations in the frequency and/or phase of each laser over time (i.e., the individual lasers will be statistically independent from each other). In order to truly obtain lasers with identical output, it would be necessary to utilize frequency locks and/or phase locks for each laser. Inherent variations in the beams can allow the beams to be incoherently combined without purposeful variation in the frequency and/or phase of the beams, but may not be able to obtain a level of profile smoothness and/or flatness necessary or highly precise applications. In instances where there is more than an insignificant variation between lasers, or where somewhat differing lasers are used, the output power of the individual lasers can be adjusted in some situations by varying the input power to the laser to recover the flat top of the combined beam. This enables control of the combined beam shape by compensating for individual laser variation in the array, as the power of the individual lasers and/or the beam radii of the individual lasers can be adjusted, such as by an optical delay line or with an adjustable lens telescope module placed in each beam path.

Figure 6:
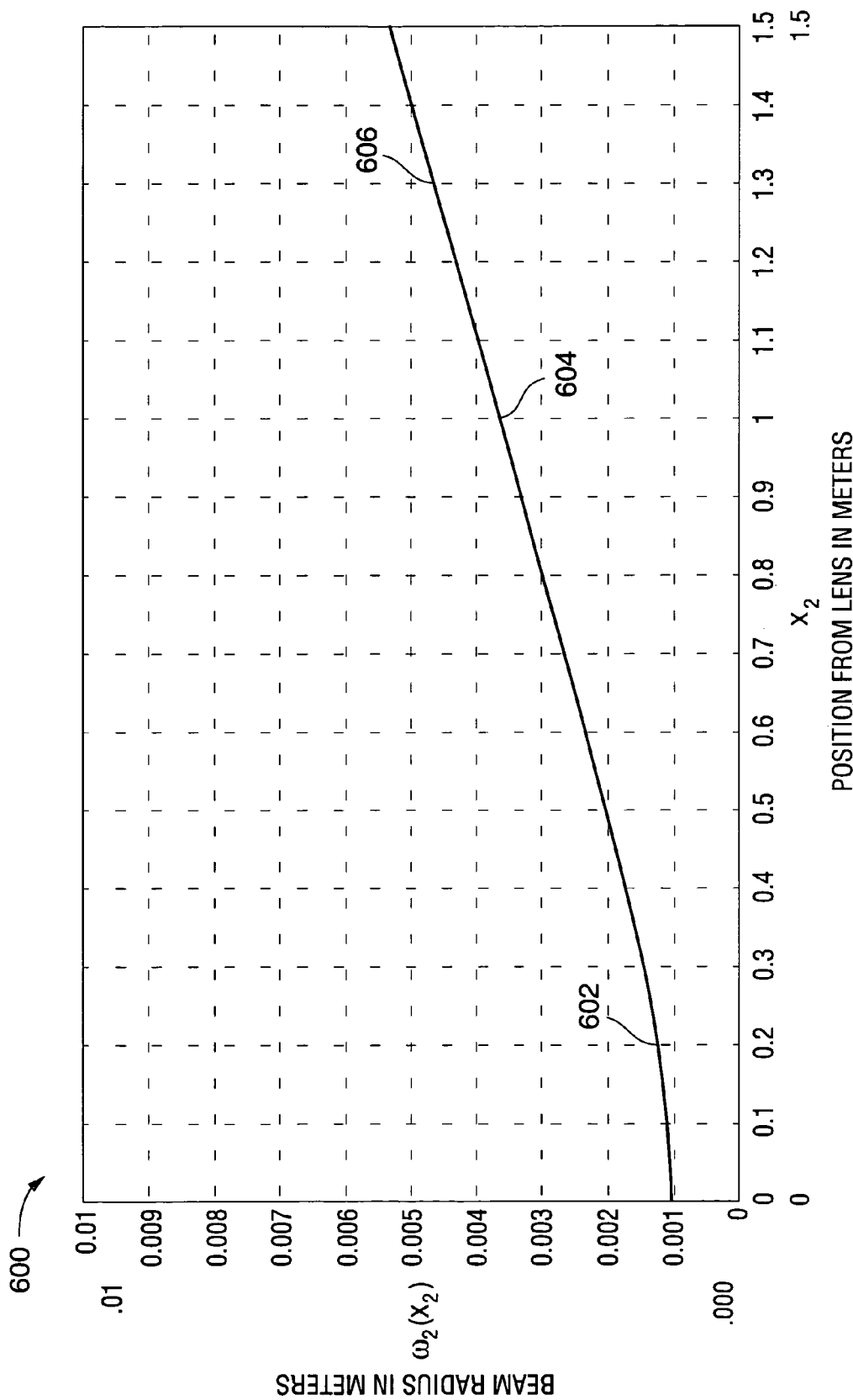
FIG. 6 is a plot of beam radius as a function of distance for the laser system approach illustrated by FIG. 1.

FIG. 6 shows a plot 600 illustrating the variation of laser beam radius verses propagation distance for a laser in accordance with one embodiment. An aperture of 0.001 meter was used in the calculations, which is approximately 0.36 times smaller than a typical square bore waveguide aperture of 0.28 cm at 10.6 μm for a $CO_2$ laser. The smaller aperture can result in a greater increase in the diffraction of the beams with an increase in distance. A smaller aperture can increase the amount of beam spreading as a function of propagation distance, such that the flat top amplitude flux variation can increase with an increase in distance along the x-axis. This increased spreading can increase the sensitivity of the ripple variation as the distance increases, serving as a "worst case" example. At a distance of about 1.0 meter from the laser source, at point 604, the beams are separated by about one beam radius. At a distance of 1.3 meters, at point 606, the beams are separated by approximately 0.8 beam radii. A work piece positioned between these two distances can experience an amplitude variation between the amounts illustrated in FIGS. 3(b) and 5(b). The power density does not vary rapidly as the distance from the laser sources increases. Precise positioning of the work piece relative to the laser sources therefore is not necessary, as power does not vary significantly with slight variations in distance. The work piece then can experience little amplitude variation across the combined flat top laser beam intensity profile for small changes in position. For the five beam case at a minimum amplitude variation of 0.8 beam radii, the length of the flat top line is 2.5 cm along the x-axis and 0.9 cm along the y-axis. For a seven beam array case, the length of the combined flat top laser line is 3.0 cm along the x-axis and 0.9 cm in the y-axis direction. Spatial filtering can be utilized to eliminate the falling edge portions of the combined beam as desired, in order to obtain a maximum flat top effect. If it is desired to reduce the size of the foot-print of the laser system, folded-optical techniques to compress z-axis distance can be utilized as known in the art.

Since the frequency and phase of each laser are independent of each other, and because the frequency and phase each drift over time, amplitude variations of the combined flat top beam can result from the beating (i.e., mixing) of the output of each laser when combined. The frequency of the amplitude variation caused by this mixing can be increased to a high value, such as in the megahertz range, whereby the variation will have no appreciable effect on the material process. This increase can be accomplished by frequency stabilizing each laser at a sufficiently large frequency separation so the respective beat frequencies become of no consequence to the material working process. For example, in order to meet short term amplitude stabilization of the power to less than +/−1% peak-to-peak over a 1 MHz to 10 Hz range, the frequency separation between each laser should be chosen to be greater than 1 MHz. Fixed frequency separation between lasers can be obtained through laser frequency off-set techniques, as known in the art.

As indicated in the arrangement of FIG. 1, a low power stable $CO_2$ laser can be used as a local oscillator (LO). The output from this LO can be mixed with the output of each laser within the array. The frequency of the LO can be locked to a line center of the laser gain curve by one of a number of well known techniques. One such technique involves dithering one of the mirrors, thereby obtaining a signal discriminate for locking the LO laser output frequency to line center by maximizing the power output of the LO. With good temperature stabilization of the laser housing, such as to 0.1 degree centigrade, and with reasonable isolation from environmental vibrations, the frequency can be locked to line center with a variation of about +/−200 KHz or less. The instantaneous laser frequency output excursions can be on the order of about +/−200 KHz. A Stark cell or Lamb dip frequency stabilization technique can be utilized if higher frequency stabilization is required, but can come with greater complexity and/or cost. Since high output power is not required from an LO laser, a lower than normal gas pressure can be used in the LO to reduce gain bandwidth. The amplitude of the signal obtained from the hill climbing servo can therefore be enhanced, with a reduced excursion of the PZT dithered mirror used to lock the frequency of the LO to line center. The reduced excursion of the mirror mounted on the PZT transducer also can reduce the instantaneous frequency excursion of the LO on each side of line center.

The incoherent combining of multiple laser beams also can use an arrangement 700 as shown in FIG. 7, which can provide a two-dimensional square beam pattern. FIG. 7(a) illustrates nine beams arranged in a square pattern, using a 3×3 array of beams. Other patterns consisting of either rectangular- or bar-shaped patterns also can be used. Each of the beams can have a beam radius "r," and can be separated by a distance 3r from each non-diagonally adjacent beam. The distance R between diagonally adjacent beams can be given by R=3r/Sin θ, such that R is 4.24 times larger than r, or 1.4 times larger than 3r. As R is not an integer multiple of r, a completely square flat top beam may not be obtained without further adjustment, such as by adjusting the relative lateral positions of the lasers as described with respect to the embodiment of FIG. 1.

Figure 7A:
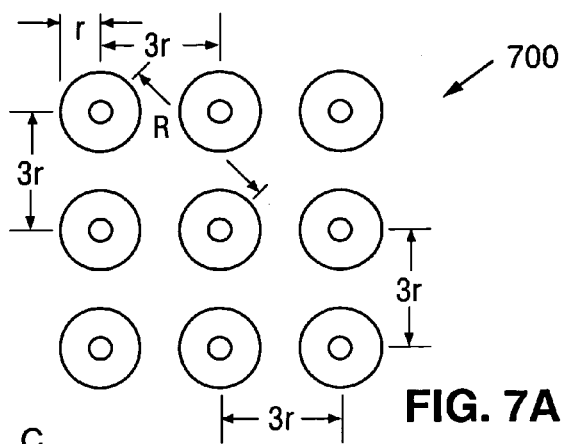
FIG. 7 is a diagram of a beam arrangement in accordance with another embodiment of the present invention.
Figure 7B:
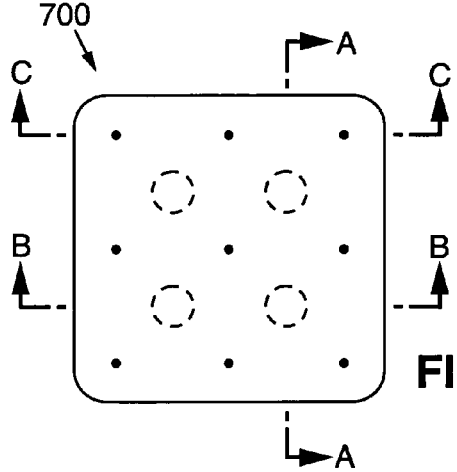
Figure 7C:
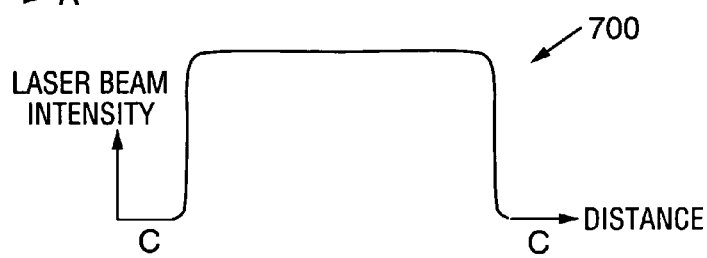
Figure 7D:
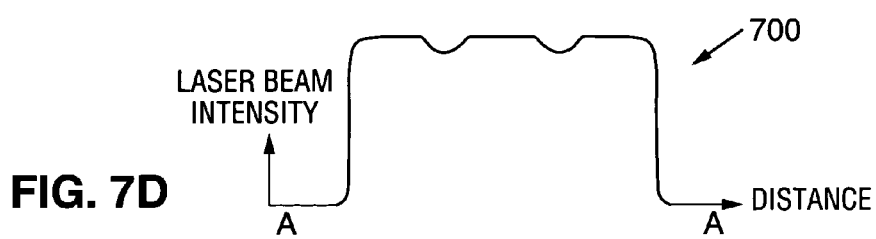
Figure 7E:
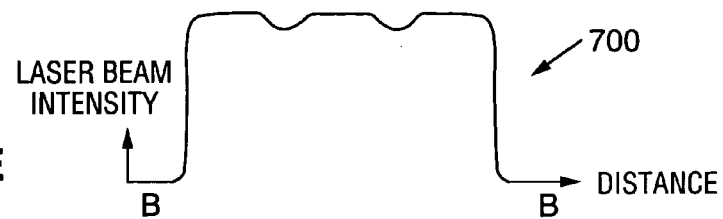

As illustrated in the plot of FIG. 7(b), four depressions in the flat top square pattern can result from such an arrangement. Viewing the combined beam pattern across the A—A line or the B—B line results in the amplitude distributions illustrated in FIGS. 7(d) and 7(e). Viewing the pattern across the C—C line results in an amplitude distribution such as is illustrated in FIG. 7(c). For some applications, amplitude variations such as those depicted in FIGS. 7(d) and 7(e) may be acceptable. Such a laser configuration can be well suited for the drilling of square rectangular or bar-shaped holes, having little taper angle along the sidewalls of the hole.

Figure 8:
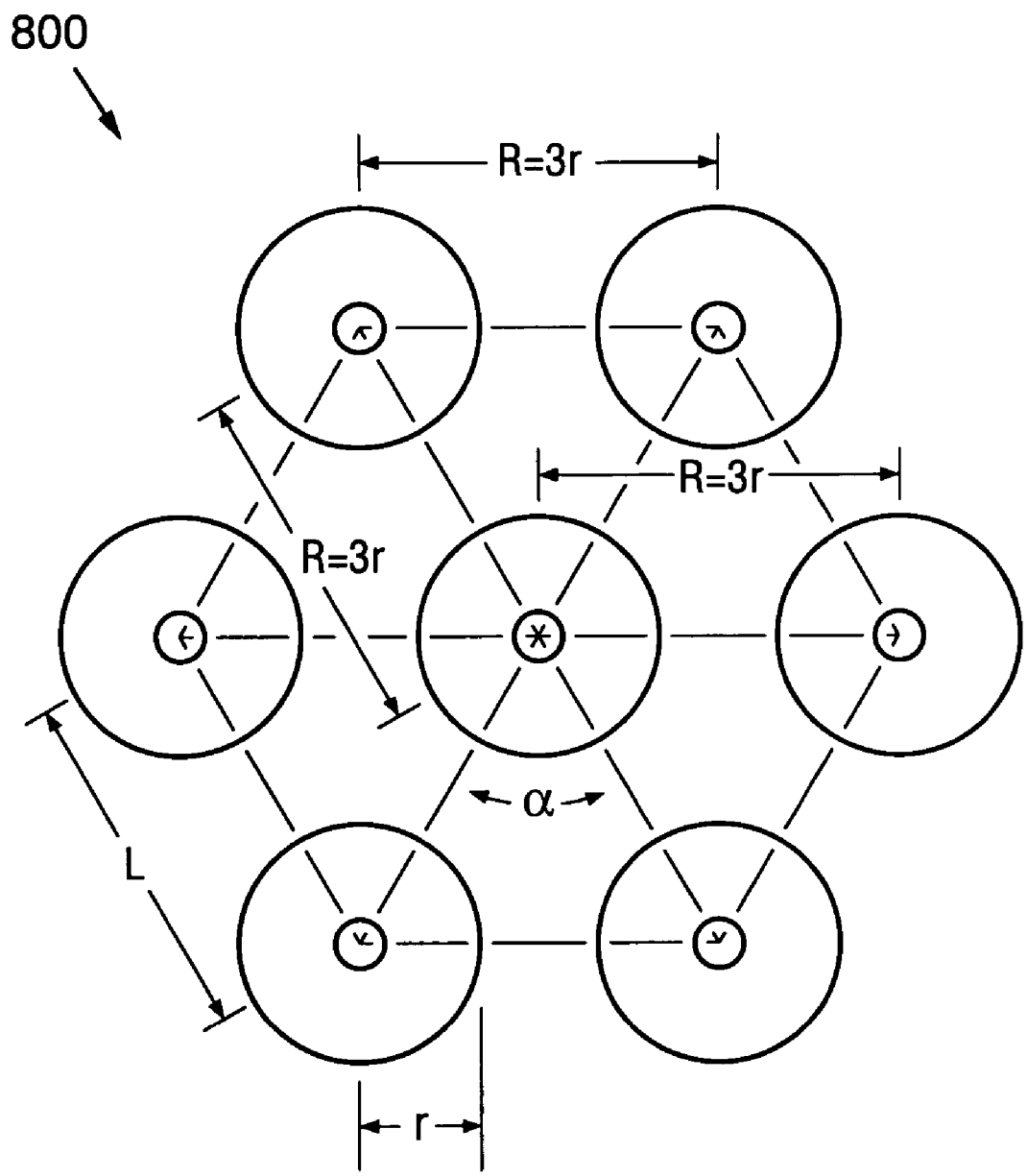
FIG. 8 is a diagram of a beam arrangement in accordance with another embodiment of the present invention.

Another configuration 800 for incoherently combining laser beams to obtain top-hat flat profiles is shown in FIG. 8, where the lasers are placed in an n-sided polygon configuration. The exemplary six-sided polygon can be particularly interesting, as the distance between the centers of any adjacent laser beams is given by R=3r, or three times the laser beam radii. For an n-sided polygon, R=2L sin(α/2), where α=2/n. For n=6, α=π/3 so that R=L. For a six-sided polygon placement of the individual lasers with the seventh laser placed in the center, the distance between the center points of any adjacent laser beams is approximately equal. This provides a basically round, flat top laser beam profile which can be suitable for drilling round shaped holes with little or no tapered angle of the sides of the holes. Aperture of the combined beams can be utilized to increase drop-off at the edges of the laser beam in order to obtain little to no angle tapering of the sidewalls of the hole.

Figure 9A:
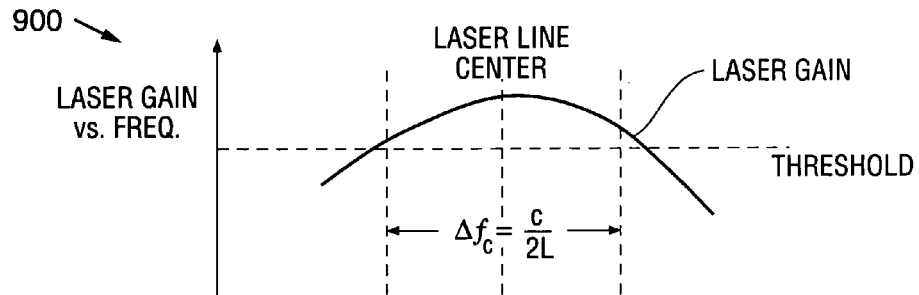
FIG. 9 is a series of plots showing behavior of one of the lasers of FIG. 1.
Figure 9B:
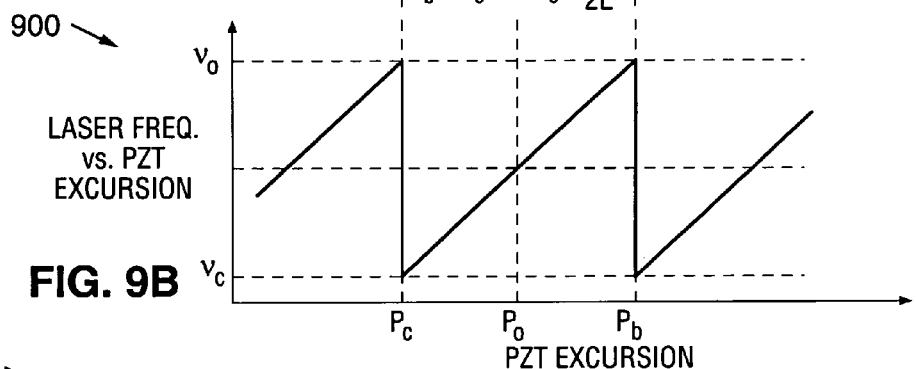
Figure 9C:
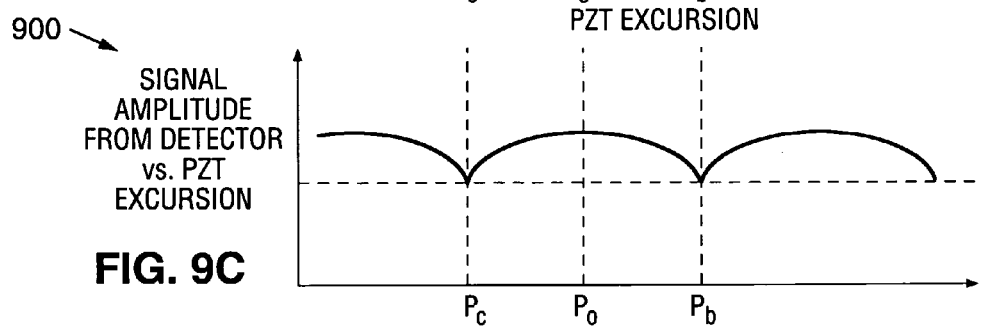

FIG. 9 shows a series of plots 900 that schematically illustrate the fundamentals of the operation of a laser using a PZT transducer to mechanically dither the position of the laser optical resonator feedback mirror. FIG. 9(a) shows a typical curve for laser gain curve as a function of laser frequency. The peak of the gain curve occurs at line center, $v_o$. The frequency separation between adjacent axial modes is given by:

$$v_b - v_c = \Delta f_c = \frac{c}{2L}$$

where c is the velocity of light and L is the total optical length of the resonator. As an example, for a seven-pass folded waveguide $CO_2$ laser where l is the length of one pass so that L=7l=350 cm, $\Delta f_c$ is approximately 43 $MH_z$. The gain line width of the laser medium is approximately 5 MHz times the laser pressure in Torr. At a pressure of about 100 Torr, for example, the laser line width is approximately 500 MHz. For a five pass folded $CO_2$ waveguide laser with L=5l=250 cm, $\Delta f_c$ is approximately 60 MHz. If one of the laser feedback mirrors is mounted on a PZT transducer and a ramp voltage is provided to the transducer such that the position of the mirror is linearly translated, the laser output frequency can change as the axial mode resonance of the optical feedback cavity moves across the gain curve, such as is illustrated in FIG. 9(a). Since the $CO_2$ laser line is homogenously broadened, only one axial resonance mode will oscillate at any given time. As the oscillating axial mode passes the oscillating threshold at $v_b$ frequency of the laser, the next lower axial mode passes the oscillating threshold at frequency $v_c$ and begins to oscillate. The change in laser output frequency, due to the mirror being linearly displaced so as to shorten the cavity length L, can cause the laser frequency to increase until frequency $v_b$ is reached. At this point, the next axial resonant mode entering the gain curve (from the left) can have a higher gain than the resonant mode exiting the gain curve (to the right). Consequently, the oscillating frequency can return to oscillating at the lower frequency $v_c$. This saw-tooth variation of laser output frequency between $v_c$ and $v_b$ is schematically illustrated in FIG. 9(b). If the output beam is detected by a suitable detector, the output amplitude can vary as a function of the cavity length being shortened, as illustrated schematically in FIG. 9(c). The reverse process occurs as the cavity length is increased.

Figure 9D:
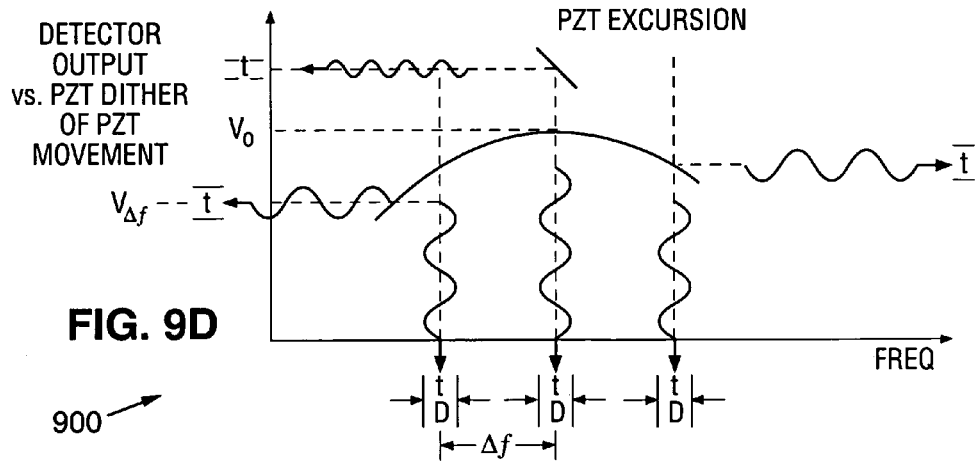

If the PZT is positioned so that the laser oscillates at line center, namely at a frequency $v_o$, and the PZT is dithered as a function of time so that a displacement D is obtained, as schematically shown in FIG. 9(d), the detector can detect a DC voltage $V_o$ that has a very small amount of amplitude variation riding on the DC voltage level. This amplitude variation in voltage can be twice the dither frequency of the mirror mounted on the PZT. This signal can be used electronically to cause the laser to oscillate at line center, such as by using hill climbing servo circuitry. If the PZT is positioned so that the laser oscillates on either side of line center by an amount equal to +/-$\Delta f$, and dithered as a function of time as schematically illustrated in FIG. 9(d), the detector can detect a voltage $V_{\Delta f}$ with an amplitude variation riding on the DC level. The frequency of this amplitude variation can equal the dither frequency of the laser. As $\Delta f$ is increased, oscillation can occur further from line center, where the slope of the gain vs. frequency curve is larger. This increase in the slope of the laser gain curve can cause the amplitude variation of the voltage to increase with increasing $\Delta f$ as illustrated schematically in FIG. 9(d). The phase of the amplitude variation signal out of the detector can change phase by 180 degrees as the laser changes oscillation from one side of line center to the other. This behavior can be used to sense the side of the gain curve on which the laser is oscillating, and further can be used to position the laser oscillating frequency to the desired location.

Figure 10:
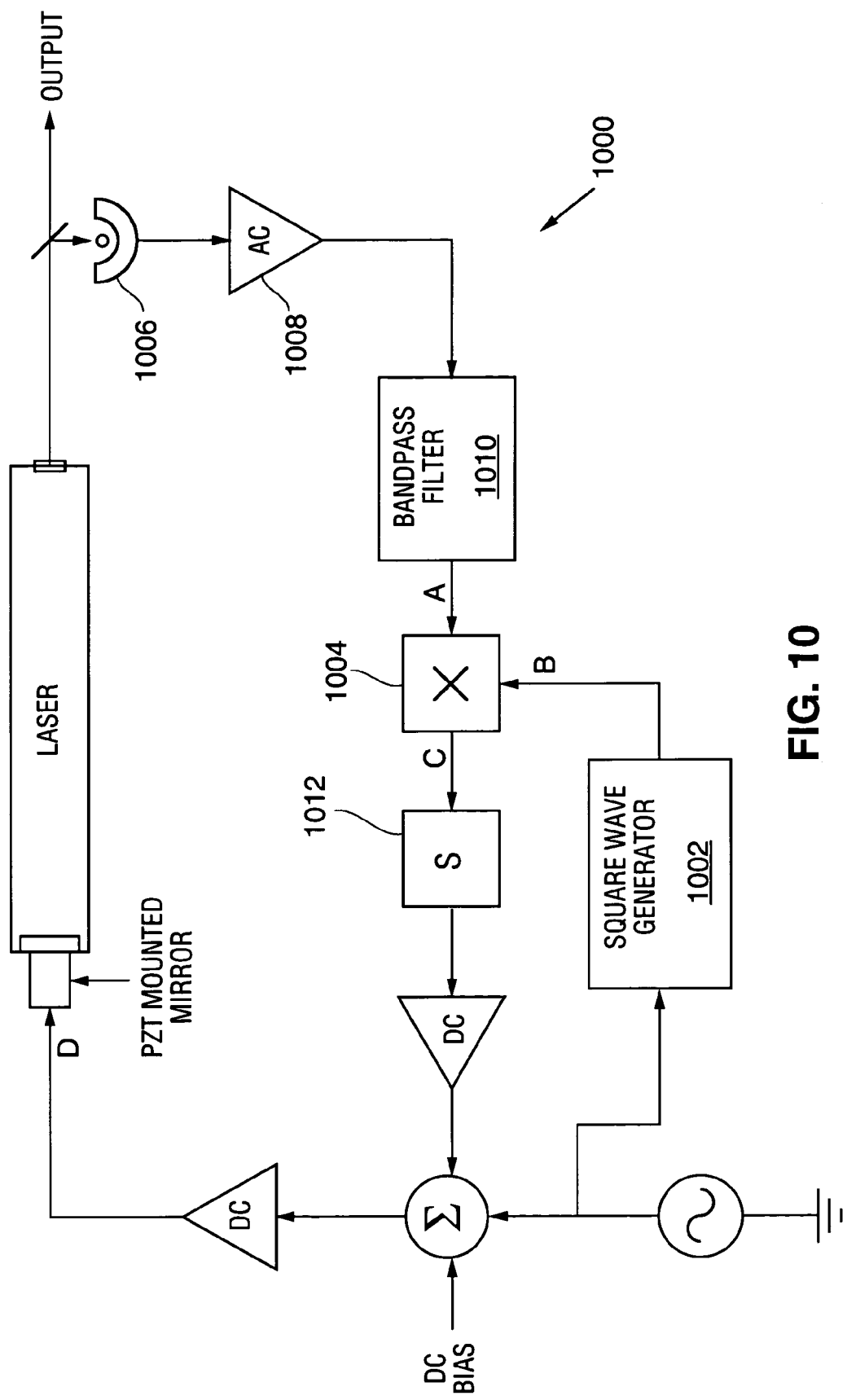
FIG. 10 is a diagram of a Hill Climbing servo approach used to lock a laser output to laser line center that can be used with the arrangement of FIG. 1.

FIG. 10 illustrates an analog circuit version 1000 of a hill climbing servo that can be used to place the oscillating frequency of a laser at line center, utilizing the behavior summarized in FIG. 9. A low frequency oscillator having a frequency $f_d$ between about 100 Hz and about 11 KHz can be used to dither the PZT transducer and, consequently, the feedback mirror. This low frequency $f_d$ signal can be passed through a square-wave generator 1002, which can generate the input signal "B" into the multiplier 1004. The output of the laser that is dithered by the PZT at frequency $f_d$ can be detected by a detector 1006. The output of the detector can be connected to an AC amplifier 1008, which can pass the output to a band pass filter 1010 centered at frequency $f_d$. The output of the band pass filter can be passed to the multiplier 1004 as signal A.

Figure 11A:
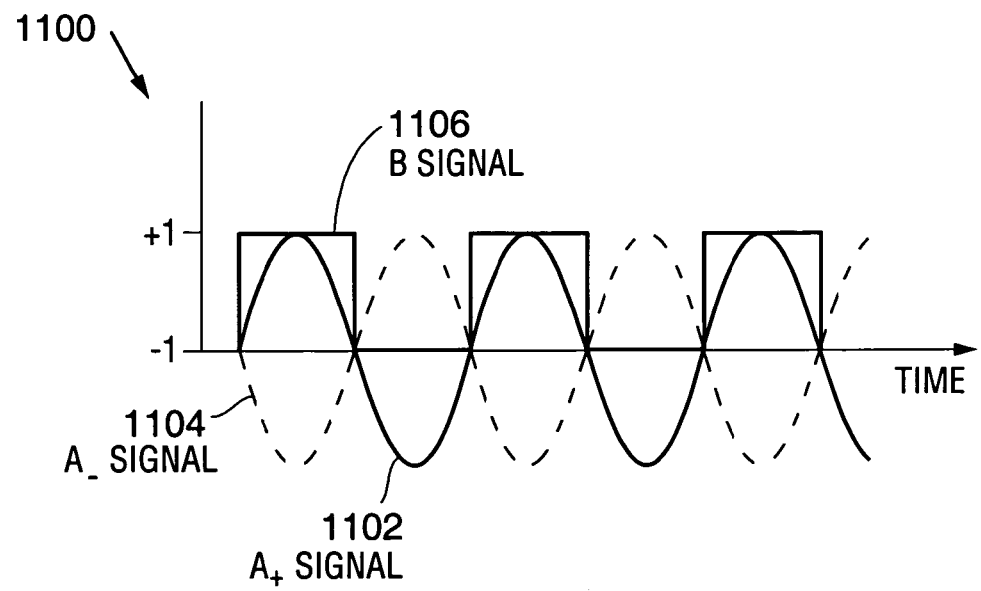
FIG. 11 is a diagram of the super positioning of the signals of FIG. 10.
Figure 11B:
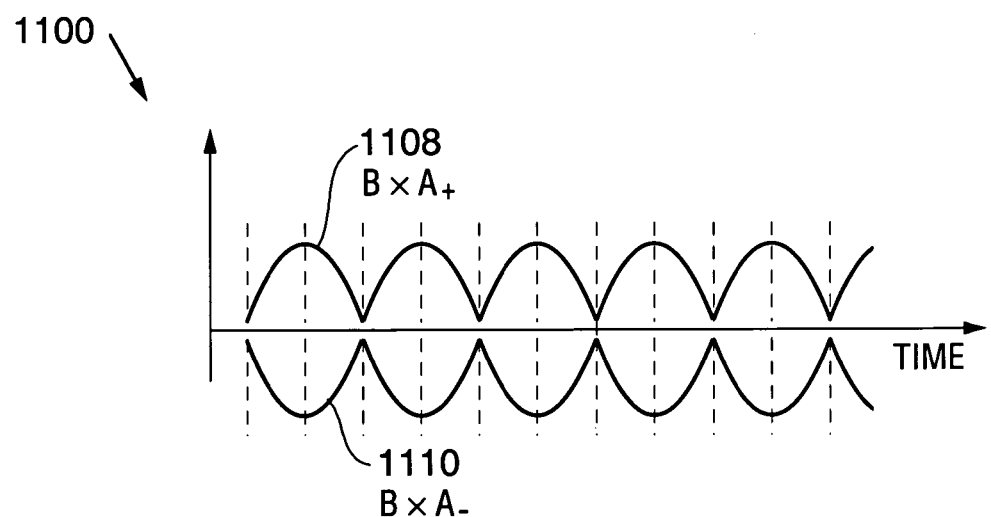

FIG. 11(a) illustrates the super positioning 1100 of the A and B signals, shown in FIG. 10, with either an in-phase condition 1102 or a 180 degrees out-of-phase condition 1104 of signal A, super imposed with the square wave of signal B 1106. FIG. 11(b) illustrates a signal "C" that results out of the multiplier from the operation of the multiplier on signals A and B, yielding B×$A_+$ (in-phase) 1108 or B×A (out-of-phase) 1110, depending upon the phase of signal A. Signal C in FIG. 10 can be integrated by an integrator circuit, passed through a DC amplifier and connected to summation circuitry, which can sum a DC bias voltage, the integrated signal C, and signal $f_d$. The output of the summation circuit can be passed through a DC amplifier and connected to the PZT transducer as signal D in FIG. 10. While the above description is for one possible embodiment, it should be understood that many other approaches can be used to lock the output of a laser to line center. For instance, digital circuitry can be used instead of analog circuitry, and/or a Stark cell or a Lamp dip can be used as a line center discriminators as known in the art. In a digital approach the local oscillator system can contain an analog amplitude stabilization circuit, which can be supervised by an embedded microcontroller. Such circuitry can optimize the length of the laser cavity in order to maximize the optical output power of the LO by applying a control signal to a PZT-actuated resonator mirror.

The analog amplitude stabilization circuitry can function as a classic hill-climbing servo system. The hill climber can adjust the resonator length to coincide with the peak of the laser medium gain curve. A control signal can be developed by applying a small sinusoidal dither signal to a PZT-actuated resonator mirror, and measuring the resulting laser amplitude fluctuations with an optical detector. Following any amplification and band pass filtering, the recovered dither signal can be synchronously detected and the resulting baseband signal can be processed as the error signal for the amplitude stabilization loop.

An embedded microcontroller can monitor the operation of the analog hill-climbing servo loop. When the PZT approaches a travel limit, the microcontroller can initiate a re-acquisition cycle. During re-acquisition the micro controller can sweep the PZT control voltage over the entire operational range while monitoring the signal from the optical detector. The micro controller can record the PZT position, which can produce the maximum output signal from the optical detector. Upon completion of the cavity sweep, the micro controller can position the PZT to the point that produced the maximum detector response, and which enables the analog amplitude stabilization loop. If the peak search or the loop reset function fails, the micro controller can perform various internal housekeeping functions and can repeat the re-acquisition process.

Figure 12:
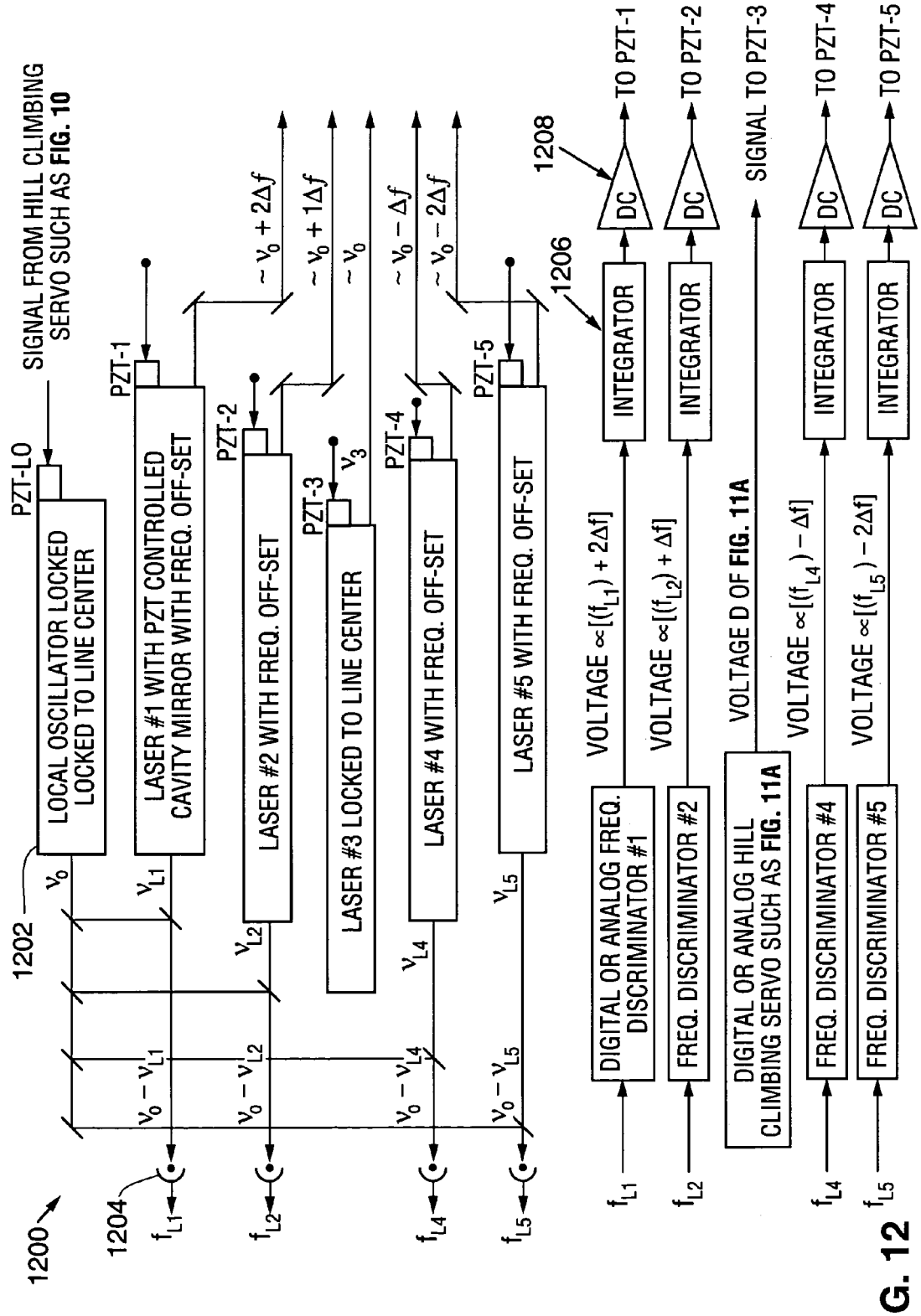
FIG. 12 is a diagram of an optical and electronic arrangement for combining five laser beams, each with a specific frequency offset, which can be used with the arrangement of FIG. 1.

In one embodiment the output from a laser local oscillator having a frequency of $v_o$ locked to line center can be split into as many separate beams as there are high power lasers in the system, for an even number of lasers, or into one less than the number of lasers in a system with an odd number of high power lasers, such as is illustrated in FIGS. 1 and 12. In one example, five folded channels of 50 cm length $CO_2$ waveguide lasers have power outputs of approximately 100 W, whereas seven folded $CO_2$ waveguide channels each of 50 cm length have an output power of approximately 140 W. The summation of the five laser beams from the five pass $CO_2$ waveguide lasers would yield 500 watts of output power, whereas the use of five $CO_2$ lasers having seven passes would yield 700 W output.

FIG. 12 shows an arrangement 1200 similar to the arrangement of FIG. 1, having additional electronics information. The local oscillator 1202 can utilize the electronics of FIG. 10 to lock laser output frequency ($v_o$) to line center, such as is shown in more detail in FIG. 9(a). The output of the hill climbing servo of FIG. 10 can be applied to the piezoelectric PZT actuator, shown as PZT-LO. The output of the LO of frequency $v_o$ can be superimposed on the outputs of lasers #1, #2, #4, and #5 having output frequencies $v_{L1}$, $v_{L2}$, $v_{L4}$ and $v_{L5}$, respectfully. The four superimposed laser beams can be applied to the photo detectors 1204 as shown, yielding RF signals $f_{L1}$, $f_{L2}$, $f_{L4}$, and $f_{L5}$. Laser #3 of the five laser array also can utilize a hill climbing servo depicted by FIG. 10 to lock the laser output to line center, using a signal from FIG. 10 applied to PZT-3 as in the LO laser. Consequently, the output frequency of laser #3 can be $v_3 = v_o$.

The RF signal from the detectors of FIG. 12, namely $f_{L1}$, $f_{L2}$, $f_{L4}$, and $f_{L5}$, can be applied to the inputs of digital, or analog, frequency discriminator (FD) circuits #1, #2, #4, and #5, respectively. Each of these frequency discriminators can generate a voltage proportional to the input frequency, plus or minus a specific frequency offset (commonly called the intermediate frequency (IF)) generated within the frequency discriminator circuit. The IF from the frequency discriminator (FD #1) can be +2 $\Delta f$, and the IF from FD#5 can be −2 $\Delta f$. Similarly for FD #2 and FD #4, the IF frequencies can be +$\Delta f$ and −$\Delta f$, respectively.

Each of the voltage outputs of frequency discriminators #1, #2, #4, and #5 can be connected to an integrator 1206 and a DC amplifier 1208. The voltage from each DC amplifier can be fed to PZT #1, #2, #4, and #5 on lasers #1, #2, #4, and PZTs can maintain the oscillating frequencies of the respective laser at +2 $\Delta f$, −2$\Delta f$, +$\Delta f$ and −$\Delta f$ from line center, thereby generating respective laser frequencies of $f_{L1} = v_o + 2\Delta f$, $f_{L2} = v_o + \Delta f$, $f_{L4} = v_o - 2\Delta f$ and $f_{L5} = v_o - \Delta f$ as shown in FIG. 12. The hill climbing servo of FIG. 12 can provide the voltage denoted as D in FIG. 10, which can lock the output frequency ($v_o$) of laser #3 to line center when connected to PZT-3 of laser #3.

Figure 13:
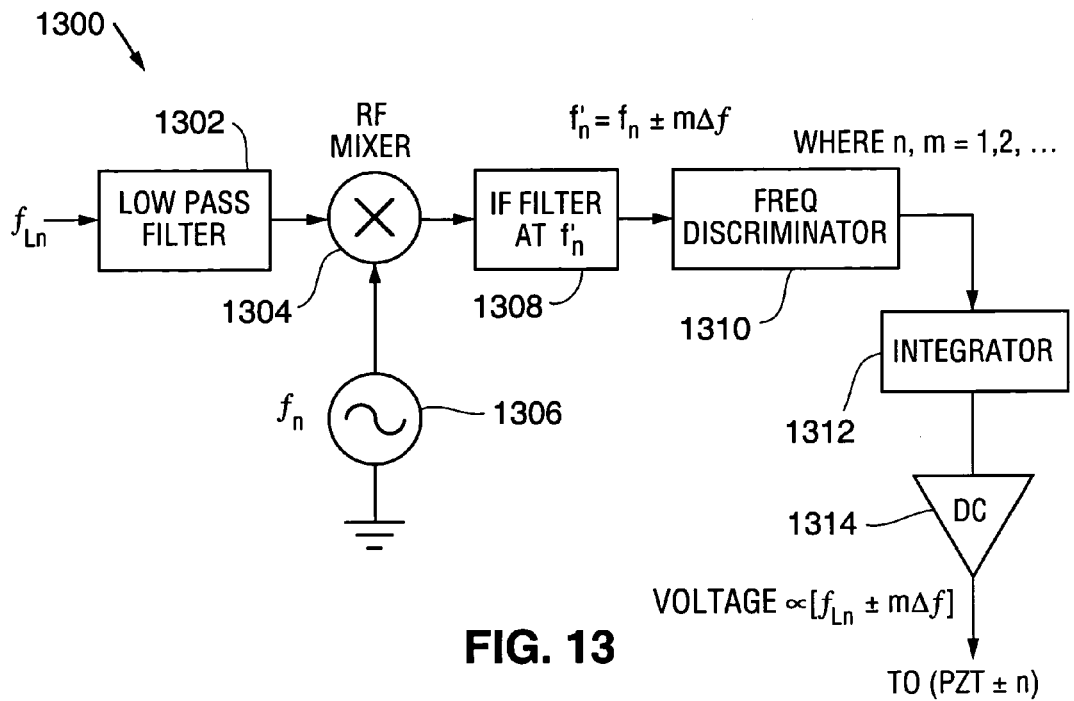
FIG. 13 is a diagram of an analog frequency set-off circuit that can be used with the arrangements of FIGS. 10 and 12.

FIG. 13 depicts an analog super heterodyne version 1300 of a laser frequency offset circuit which encompasses the frequency discriminator, integrator, and DC amplifier shown in FIG. 12. An RF frequency from an "$n^{th}$" laser, the frequency designated as $f_{Ln}$, can be passed through a low pass filter 1302 to an RF mixer 1304. An IF oscillator 1306 at frequency $f_n$ also can be connected to the RF mixer 1304. The signal from the mixer can be connected to an IF filter 1308 centered at frequency $f_n = f_{Ln} \pm m\Delta f$, where n and m are integers. The $f_n$ signal can be passed to a frequency discriminator 1310, then to an integrator 1312, and finally to a DC amplifier 1314. The DC amplifier 1314 can have a voltage output that is proportional to $f_{Ln} \pm m\Delta f$. This signal can be connected to the respective PZT±n.

Figure 14:
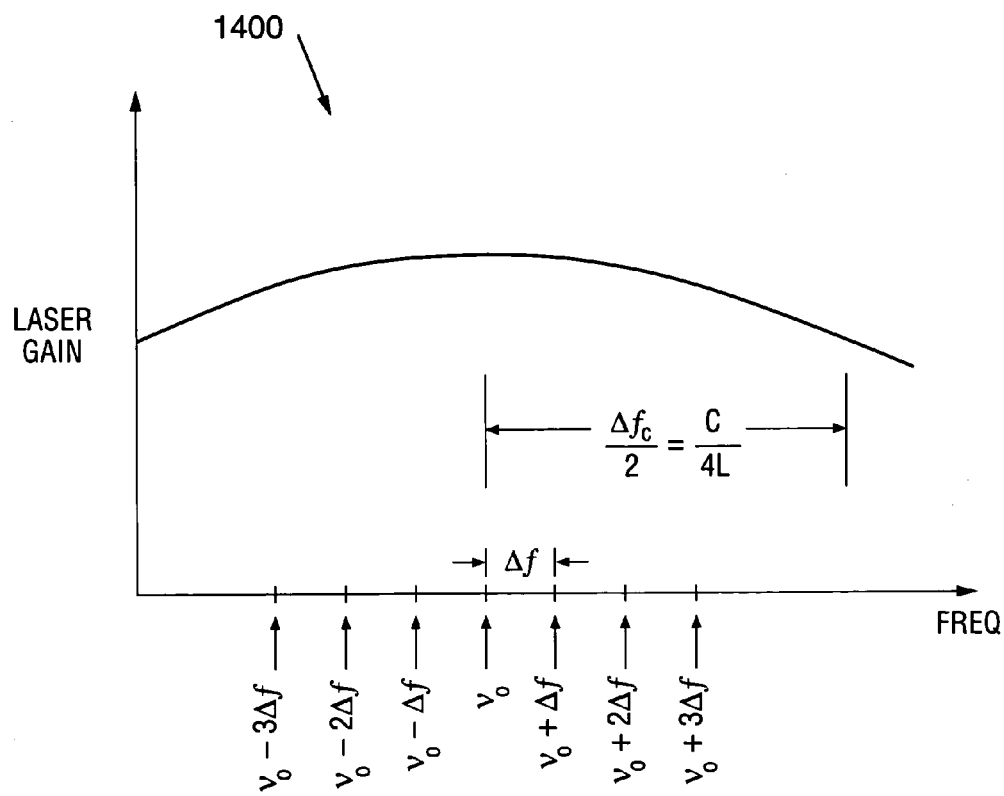
FIG. 14 is a plot of gain versus frequency for a seven beam combiner, with each laser frequency separated from an adjacent laser by $\Delta f$.

FIG. 14 illustrates a typical plot 1400 for a $CO_2$ laser medium gain versus frequency curve for a seven laser beam combiner. Each of the laser beam output frequencies can be offset by approximately $\Delta f = 5$ MHz from the adjacent laser, such as by using the electronics of FIGS. 10–13. For $\Delta f = 5$ MHz, the frequency separation between the longitudinal Fabry-Perot modes $\Delta f_c = c/2L = 107$ MHz, for an optical resonator having a length L=140 cm. This calculation assumes a waveguide laser with seven folds in a zigzag pattern, each having a channel length of approximately 20 cm. For seven lasers with one at line center and three on each side of line center, and with each laser having a frequency separation of about 5 MHz from the adjacent laser frequency, a $3\Delta f = 15$ MHz frequency extension can result from each side of line center. This is well below the 51.4 MHz frequency limit imposed by the $\Delta f_c/2 = 51.4$ MHz of the next longitudinal mode of the resonator. There then can be sufficient "frequency-space" to accommodate more than three lasers on each side of the line center if desired. As another example, if L=7l=350 cm, then $\Delta f_c = 42.8$ MHz and $\Delta f_c/2 = 21.4$ MHz, such that $3\Delta f = 15$ MHz can still be accommodated.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A laser system for forming a flat top laser beam, comprising:
   a plurality of lasers, each laser producing an output beam; and
   a plurality of optical elements for combining the output beams from the plurality of lasers in order to form a combined beam having a flat top intensity profile;
   wherein the relative position of each of the plurality of lasers is staggered, such that at a plane orthogonal to the direction of the output beams produced by the lasers an optical distance along a beam path from that plane back to each of the lasers is equivalent.

2. A laser system as recited in claim 1 wherein the plurality of lasers includes a plurality of lasers selected from the group consisting of rectangular bore and square bore waveguide $CO_2$ lasers.

3. A laser system according to claim to claim 1, wherein:
   each of said plurality of lasers produces an output beam having a Gaussian energy distribution.

4. A laser system according to claim 1, wherein:
   each of said plurality of lasers produces an output beam having an elliptical shape.

5. A laser system according to claim 1, wherein:
   each of said plurality of lasers has a power level between about 50 W and about 200W.

6. A laser system according claim 1, further comprising:
   a laser beam-frequency adjustment device in the path of one of the output beams.

7. A laser system according to claim 1, wherein:
   each of said plurality of lasers has an adjustable power level.

8. A laser system according to claim 1, further comprising:
an aperture in a beam path of one of the output beams to increase the spreading of the output beam.

9. A laser system according to claim 1, further comprising:
means for spatially filtering each output beam in order to eliminate falling edge portions of the combined beam.

10. A laser system as recited in claim 1 wherein the plurality of lasers have a fixed frequency separation.

11. A laser system according to claim 1, wherein:
the plurality of optical elements are selected from the group consisting of lenses, polarizers, mirrors, beam splitters, windows, and prisms.

12. A laser system according to claim 1, wherein:
each of said plurality of lasers is locked at a different frequency.

13. A laser system for forming a flat top laser beam, comprising:
a plurality of lasers, each laser producing an output beam;
a plurality of optical elements for combining the output beams from the plurality of lasers in order to form a combined beam having a flat top intensity profile; and
adjustable optical delay lines for ensuring that an optical path length from each laser to a plane perpendicular to the output beams is identical.

14. A laser system according to claim 13, wherein:
each of said plurality of lasers is locked at a different frequency.

15. A method for forming a flat top beam, comprising the steps of:
generating a plurality of output beams using a plurality of lasers;
staggering the relative position of each of the plurality of lasers;
locking the frequency of each output beam; and
incoherently combining the plurality of output beams to form a combined beam with a flat top intensity profile.

16. A laser system as recited in claim 15 further including a frequency lock mechanism locking the frequency of one of the output beams.

17. A method according to claim 15 wherein
generating a plurality of output beams includes using a plurality of square bore waveguide $CO_2$ lasers; and.

18. A method according to claim 15 wherein the step of:
generating a plurality of output beams includes using a plurality of rectangular bore waveguide $CO_2$ lasers.

19. A method according to claim 15 wherein the step of generating a plurality of output beams includes output beams having an elliptical shape.

20. A method according to claim 15, wherein:
generating a plurality of output beams includes generating output beams each having a Gaussian profile.

21. A method according to claim 15, wherein:
generating a plurality of output beams includes generating output beams each having a power level between about 50 W and about 200 W.

22. A method according to claim 15, further comprising:
positioning the plurality of lasers in a linear array.

23. A method as recited in claim 15 further including the step of
setting a fixed frequency separation for the plurality of output beams.

24. A method according to claim 15,
wherein the frequency of each output beam is locked using a frequency lock mechanism.

25. A method according to claim 15, further comprising:
redirecting each of the output beams such that the output beams are separated by a distance on the order of at least two laser beam radii.

26. A method according to claim 15, further comprising:
positioning a laser beam-frequency tuning device in a beam path of one of the output beams.

27. A method according to claim 15, further comprising:
adjusting a power level of one of the plurality of lasers.

28. A method according to claim 15, further comprising:
placing an aperture in a beam path of one of the output beams to increase a spreading of the output beam.

29. A method according to claim 15, further comprising:
spatially filtering the output beams in order to eliminate falling edge portions of the combined beam.

30. A method of forming a flat top beam comprising the steps of:
generating a plurality of output beams using a plurality of lasers;
incoherently combining the plurality of output beams to form a combined beam with a flat top intensity profile; and
ensuring an identical optical path length from each output beam to a plane perpendicular to the output beams.

31. A method of machining a surface, comprising:
generating a plurality of output beams using a plurality of lasers, the plurality of output beams having a fixed frequency separation;
staggering the relative position of each of the plurality of lasers; and
directing the output beams along substantially parallel beam paths, the beam paths being separated such that energy from the output beams incoherently combines to form a machining beam with a smooth top intensity profile at a plane of treatment located a distance from the plurality of lasers.

32. A method according to claim 31, further comprising:
locking a frequency of each of the plurality of output beams using at least one frequency lock mechanism.

33. A method according to claim 31, wherein:
directing the output beams along substantially parallel beam paths includes directing the output beams such that the output beams are separated by a distance on the order of at least two laser beam radii.

34. A laser system for forming a flat top laser beam, comprising:
a plurality of lasers each producing an output beam, the relative position of each of the plurality of lasers being staggered such that at a plane orthogonal to the direction of the output beams produced by the lasers an optical distance along a beam path from that plane back to each of the lasers is equivalent;
a plurality of optical elements for incoherently combining the output beams from the plurality of lasers in order to form a combined beam having a flat top intensity profile; and
at least one frequency lock mechanism for locking the frequency of at least one of the output beams.

35. A laser system for forming a flat top laser beam, comprising:
a plurality of lasers, each laser producing an output beam;
a plurality of optical elements for incoherently combining the output beams from the plurality of lasers in order to form a combined beam having a flat top intensity profile; and adjustable optical delay lines for ensuring that an optical path length from each laser to a plane perpendicular to the output beams is identical.

36. A laser system for forming a combined laser beam for treating a workpiece comprising:
at least three separate gas lasers, each producing a laser output beam having a non-uniform intensity profile;
a plurality of optical elements for directing the propagation axes of the beams so that the beams partially overlap in a plane spaced from the lasers in manner to create a combined beam spot having a substantially flat top intensity profile in that plane; and
a frequency lock mechanism associated with each of the lasers and arranged such that each laser will generate a different fixed frequency output beam and with the separation between each of the frequencies being selected so that the frequency of any amplitude variations in the combined beams due to beating is increased an amount sufficient so that such variations will have no appreciable effect on the treatment of the workpiece.

37. A laser system as recited in claim 36, wherein the difference between the output frequencies of each laser is at least 1 MHz.

38. A laser system as recited in claim 36, wherein said frequency lock mechanism includes a PZT element associated with a cavity mirror of each laser and configured to stabilize the length of the laser cavity.

39. A laser system as recited in claim 36, further including an additional gas laser configured as a local oscillator, said local oscillator being frequency locked to the center line of the gain curve, with the output of the local oscillator being used as a reference frequency in a feedback loop to control the output frequency of at least two of the other lasers in the system.

40. A laser system as recited in claim 36, wherein said optical elements direct the beam along parallel paths and wherein the spreading of the beams via diffraction results in a beam separation at said plane of one beam radius or less.

41. A laser system as recited in claim 36, wherein said lasers are carbon dioxide waveguide lasers.

42. A laser system as recited in claim 41, wherein the channels of said waveguide are square.

43. A laser system as recited in claim 41, wherein the channels of said waveguide are rectangular.

44. A laser system as recited in claim 36, wherein the combined beam spot has a linear shape.

45. A laser system as recited in claim 36, wherein each of the lasers generate an output beam having a power level greater than 50 watts.

46. A laser system as recited in claim 36, further including a means for selectively controlling the output power of each of the lasers.

47. A laser system for forming a combined laser beam for treating a workpiece comprising:
at least three separate primary gas lasers, each producing a laser output beam having a non-uniform intensity profile;
a plurality of optical elements for directing the propagation axes of the beams along adjacent paths so that after diffraction, the beams will partially overlap in a plane spaced from the lasers in manner to create a combined beam spot having a substantially flat top intensity profile in that plane;
a frequency lock mechanism associated with each of the lasers, said frequency lock mechanism including a PZT element associated with a cavity mirror of each laser and configured to stabilize the length of the laser cavity; and
a local oscillator defined by an additional gas laser, said local oscillator being frequency locked to the center line of the gain curve, with the output of the local oscillator being used as a reference frequency in a feedback loop to control the output frequency of at least two of the primary lasers in the system, said system being arranged such that each primary laser will generate a different fixed frequency output beam and with the separation between each of the frequencies being selected so that the frequency of any amplitude variations in the combined beams due to beating is increased an amount sufficient so that such variations will have no appreciable effect on the treatment of the workpiece.

48. A laser system as recited in claim 47, wherein the difference between the output frequencies of each of the primary lasers is at least 1 MHz.

49. A laser system as recited in claim 47, wherein the combined beam spot has a linear shape.

50. A method of for treating a workpiece with a plurality of laser beams, each generated by a separate gas laser, each laser producing a laser output beam having a non-uniform intensity profile, said method comprising the steps of:
directing the propagation axes of the beams so that the beams partially overlap in a plane spaced from the lasers in manner to create a combined beam spot having a substantially flat top intensity profile in that plane; and
frequency locking each of the lasers so that each laser will generate a different fixed frequency output beam and with the separation between each of the frequencies being selected so that the frequency of any amplitude variations in the combined beams due to beating is increased an amount sufficient so that such variations will have no appreciable effect on the treatment of the workpiece.

51. A method as recited in claim 50, where the difference between the output frequencies of each laser is at least 1 MHz.

52. A method as recited in claim 50, wherein the step of frequency locking the lasers includes adjusting the cavity length of at least some of the lasers in a feedback loop based on a comparison to a reference frequency.

53. A method as recited in claim 50, further including the step of controlling the output power of each of the lasers to improve the uniformity of the intensity distribution of the combined beam spot.

54. A method as recited in claim 50, wherein the combined beam spot has a linear shape.

* * * * *